US 12,184,765 B2

United States Patent
Hulshof

(10) Patent No.: US 12,184,765 B2
(45) Date of Patent: Dec. 31, 2024

(54) PASSWORD SECURITY HARDWARE MODULE

(71) Applicant: Charter Communications Operating, LLC, St. Louis, MO (US)

(72) Inventor: Robert Hulshof, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 786 days.

(21) Appl. No.: 16/988,583

(22) Filed: Aug. 7, 2020

(65) Prior Publication Data

US 2022/0045848 A1 Feb. 10, 2022

(51) Int. Cl.
*H04L 9/08* (2006.01)
*G06F 12/14* (2006.01)
*H04L 9/32* (2006.01)

(52) U.S. Cl.
CPC .......... *H04L 9/085* (2013.01); *G06F 12/1408* (2013.01); *H04L 9/0891* (2013.01); *H04L 9/3226* (2013.01); *H04L 9/3236* (2013.01); *H04L 2209/16* (2013.01)

(58) Field of Classification Search
CPC ..... H04L 9/085; H04L 9/0891; H04L 9/3226; H04L 9/3236; H04L 63/08; H04L 63/083; G06F 12/1408
See application file for complete search history.

(56) References Cited

U.S. PATENT DOCUMENTS

| 4,290,286 A | * | 9/1981 | Rae | E05B 37/02 70/279.1 |
| 6,079,021 A | * | 6/2000 | Abadi | G06F 21/46 713/184 |
| 7,664,960 B1 | * | 2/2010 | Clubb | H04N 7/163 713/168 |
| 8,103,246 B2 | * | 1/2012 | Singhal | G06Q 20/341 455/442 |
| 9,258,118 B1 | * | 2/2016 | Roth | H04L 9/0872 |

(Continued)

OTHER PUBLICATIONS

Wikipedia, "Secure cryptoprocessor," Jun. 2020, pp. 1-5.

(Continued)

*Primary Examiner* — Shanto Abedin
(74) *Attorney, Agent, or Firm* — Otterstedt & Kammer PLLC

(57) ABSTRACT

Establish a secure connection from a device to a server by, at the device: sending a shared secret request (SSRq) and an obfuscated secret value of the device to the server, wherein the SSRq is encrypted by a symmetric rolling key known to the device and to a trusted authority but not known to the server and the SSRq incorporates a symmetric key for decrypting the device's obfuscated secret value; receiving a shared secret response (SSRs) and an obfuscated secret value of the server, wherein the device's symmetric rolling key encrypts the SSRs and the SSRs incorporates a symmetric server obfuscation key for decrypting the server's obfuscated secret value; calculating a shared secret by hashing a concatenation of the device's secret value and the server's secret value; generating a symmetric session key based on the shared secret; and establishing the secure connection using the symmetric session key.

10 Claims, 11 Drawing Sheets

(56) References Cited

U.S. PATENT DOCUMENTS

| | | | | |
|---|---|---|---|---|
| 9,270,670 | B1* | 2/2016 | Fitzgerald | G06F 21/45 |
| 2005/0027713 | A1* | 2/2005 | Cameron | H04L 63/083 |
| 2013/0305392 | A1* | 11/2013 | Bar-El | H04L 9/3263 |
| | | | | 726/29 |
| 2014/0181529 | A1* | 6/2014 | Joyce, III | G06F 21/83 |
| | | | | 726/5 |
| 2015/0172272 | A1* | 6/2015 | Levner | H04L 63/083 |
| | | | | 726/7 |
| 2017/0185780 | A1* | 6/2017 | Kao | H04L 63/102 |
| 2017/0317828 | A1* | 11/2017 | Reinhold | H04L 63/083 |
| 2020/0028679 | A1* | 1/2020 | Chumbley | H04L 9/0863 |
| 2020/0137096 | A1* | 4/2020 | Endler | H04L 63/083 |

OTHER PUBLICATIONS

Wikipedia, "Combination lock," Aug. 2020, pp. 1-5.
raspberrypi.org, "Alpha boards in manufacture," Jul. 2011, pp. 1-78.

* cited by examiner

PASSWORD SECURITY HARDWARE MODULE

BACKGROUND

Electronic devices such as computers, smart phones, tablets, and the like, run very complex software stacks and applications. These software stacks often use open source code software libraries which are written and maintained by external software engineers/communities; therefore, it is typical that companies making these electronics devices do not have complete knowledge about every part of the software running on the device, which makes it nearly impossible to fully secure these devices, as is seen with the ever-increasing number of attacks.

Most network services require password authentication. Because of the complexity of the code, it is nearly impossible to know for sure that a device and the passwords entered using that device have not been compromised. For example, it is possible that a hidden service (a "keystroke logger" and/or "packet sniffer") runs on these devices, which captures keyboard input and network data and transmits this information to an external server, without the user knowing that this is happening, effectively compromising all passwords of the user.

Furthermore, it is expected that within 10 years, quantum computers will have advanced to the point that they will be able to decrypt the currently universally-used RSA- and Elliptical curve-based cryptographic algorithms.

SUMMARY

Techniques are provided for a password security hardware module. In one aspect, a method is provided for securely entering an access code using an insecure device. The method includes generating a random code; displaying the random code at a display; selecting a digit of the random code in response to a first input from the insecure device; adjusting the selected digit of the random code in response to a second input from the insecure device; and repeating the steps of selecting and adjusting digits of the random code until the incremented digits of the random code match all digits of the access code.

Another aspect of the disclosure provides a secure device, which includes a main processor; a first interface that is adapted to connect an external visual display in communication with the main processor; a second interface that is adapted to connect a keyboard in communication with the main processor; a third interface that is adapted to connect an insecure device in communication with the main processor; a secure microprocessor that is connected in communication with the main processor; and an internal visual display connected in communication with the main processor. The secure microprocessor comprises a password manager module and embodies computer executable instructions. The main processor is configured by the computer executable instructions to implement a method, which includes: securely entering a server password from the keyboard to the password manager module; and securely delivering the server password to the server via an insecure device.

According to another aspect, the disclosure provides a method for establishing a secure connection from a device to a server. The method includes, at the device: sending a first shared secret request and an obfuscated secret value of the device from the device to the server, wherein the first shared secret request is encrypted by a symmetric rolling key known to the device and to a trusted authority but not known to the server and the first shared secret request incorporates a symmetric device obfuscation key for decrypting the device's obfuscated secret value; receiving a first shared secret response and an obfuscated secret value of the server from the server, wherein the first shared secret response is encrypted by the device's symmetric rolling key and the first shared secret response incorporates a symmetric server obfuscation key for decrypting the server's obfuscated secret value; calculating a shared secret of the device and the server by concatenating the device's secret value and the server's secret value and hashing the result; generating a symmetric session key for the secure connection based on the shared secret; and establishing the secure connection using the symmetric session key to encrypt all traffic between the device and the server.

Another aspect of the disclosure provides a method for password-based authentication of a client to a server. The method includes: the server sending a nonce to the client; the client generating a cryptographically secure hash from the nonce and a secure hashed version of a client password; the client sending the cryptographically secure hash to the server; the server, which has a copy of the secure hashed version of the client password, verifying that the cryptographically secure hash can only be generated from the secure hashed version of the password and the nonce; and the server granting access to the client in response to the verifying step.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, a security module ('secure device') according to exemplary embodiments has hardware support for several advantageous and technically beneficial features that can be used to secure computers from attacks, which features include, for example, one or more of the following:

Securing keys and passwords: All (private) keys and passwords that are managed by the security module can only be entered off-line (not connected to any network) and are stored in the persistent memory of a tamper-proof secure micro embedded in the security module. After the key/password is entered it can only be used in cryptographic operation within the secure micro, and never be read back.

Securing password entry: The security module is connected between the keyboard and the computer and therefore all keys send by the keyboard to the computer will flow through the security module. If a (network) service requests a password for authentication, then the security module will capture every keyboard character and only return a hashed version of the password to the customer device.

Two-factor authentication: The security module has several tamper-proof asymmetric and symmetric keys programmed in its secure micro at manufacturing. These module unique keys can be used as second authentication for (network) services. The algorithms in the secure micro allows unique two-factor authentication for each service.

Network link security: An application running on a computer consumer device can instead of connecting to a network service directly, use the security module as a proxy to make the secure connection with the service. The security module network connection is (guaranteed) secure and additionally if the link data must stay secure beyond the time in future when quantum computers may be available, then the security module can establish a quantum computing secure connection as well.

These and other features and advantages of the present invention will become apparent from the following detailed description of illustrative embodiments thereof, which is to be read in connection with the accompanying drawings.

DETAILED DESCRIPTION

Some aspects of the invention provide a password security hardware module, which connects to an insecure electronic device to address software security vulnerabilities of the device. The targeted electronic devices have significant computing power and support one or more network connections; they include, for example computers, "smart" phones, and tablets. These targeted electronic devices are further referred to herein as 'computers.'

One aspect of the invention provides a method for securely entering an access code using an insecure device.

Rather than continuing a cycle where ever more complex software on more devices results in new security vulnerabilities that have to be addressed at a later time, it would be better to assume that these electronic devices are not secure and use separate hardware to secure these devices. A hardware security module which has as its only task securing the devices it is connected to, can be relatively simple and can therefore be made very secure.

Because some information needs to stay secret (secure) for longer than 10 years and a lot of data is routinely captured and stored for future usage, it is already useful to secure certain connections with quantum computer secure algorithms that use asymmetric cryptography. However, a hardware-based security module with individualized keys can establish quantum computing secure connections using symmetric key cryptography with sufficiently large keys (e.g. AES256).

Accordingly, some aspects of the invention provide a security module that connects to an electronic device (e.g., a computer, phone, tablet, etc.) to address software security vulnerabilities of the device. The targeted electronic devices have significant computing power and support one or more network connections. These targeted electronic devices are referred to herein as "computers."

Figure 1:
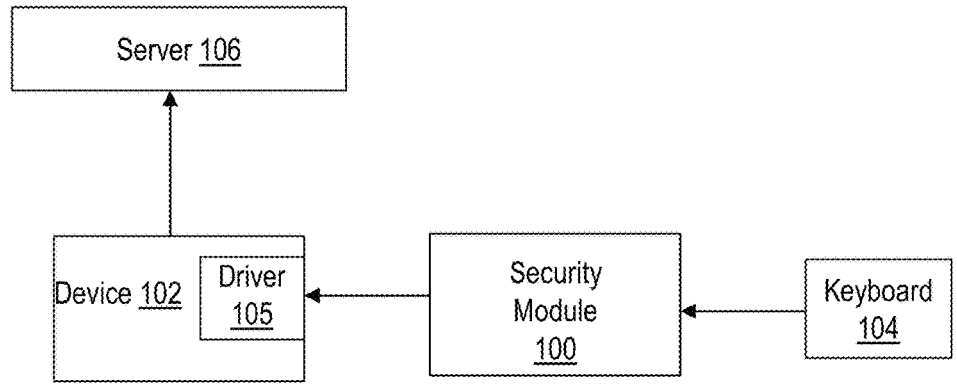
FIG. 1 shows in a schematic how a security module is typically used, according to an exemplary embodiment.

FIG. 1 shows an overview diagram of how the security module 100 is typically used. The module 100 is connected to an electronic device (computer) 102 and a keyboard 104. All keyboard 104 entries flow through the security module 100 to the computer 102. In one or more embodiments, the computer 102 includes a special security module driver 105. In other embodiments, no special driver is provided and the security module 100 appears to the computer 102 to be the keyboard 104. Any connection that can be cryptographically secured can be used between the computer and the security module. In one or more embodiments of the security module, the connection to the computer is a USB (Universal Serial Bus) or NFC (Near-Field Communication) connection. Generally, for password protection, cryptographic security for the connection between the computer and module is not essential, but cryptographic security should normally be employed for the network link security function/feature.

Applications running on the computer 102 use the security module 100 to secure and authenticate a network connection between the computer 102 and a server 106 that provides network services.

Figure 2:
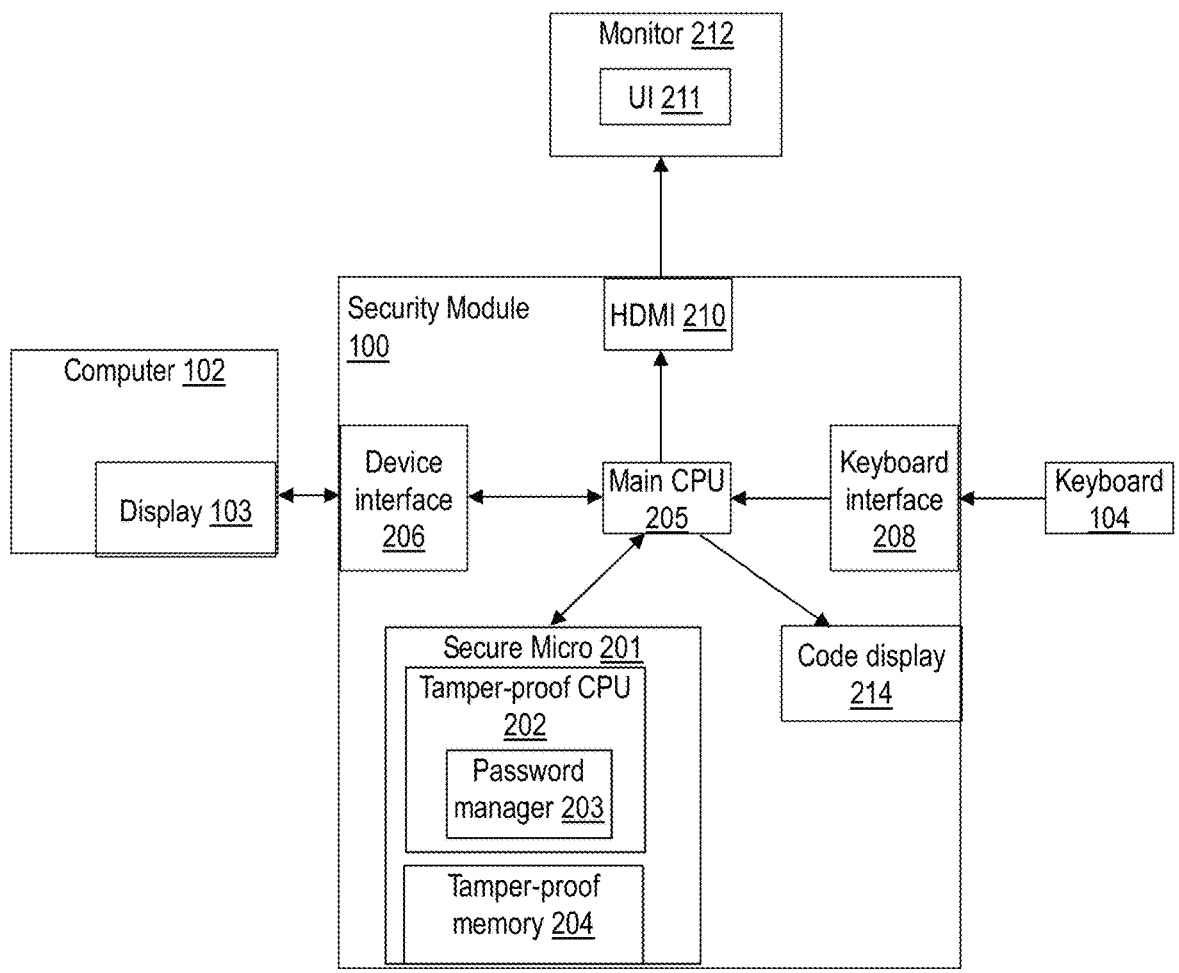
FIG. 2 shows components of a security module in a schematic, according to an exemplary embodiment.

FIG. 2 shows a high-level overview of the components in an embodiment of the secure module 100.

Secure micro 201: The secure micro includes a tamper-proof CPU, which performs all important security operations. The secure micro also includes secure (tamper-proof) memory which is used to store all important keys and passwords in a password manager 203. Modifying passwords or keys requires a master password, and can only occur if the module is off-line (computer connection is disabled). Once a key is entered into the secure micro it can only be used in secure cryptographic operations and never read back outside the secure micro 201. For example, the secure micro has multiple keyslots (0-99) and an application running on the computer 102 wants to encrypt some data using key number 37. The information provided to the secure micro 201 is the data and slot number 37 and the secure micro will return the encrypted data. The actual key that is stored in the secure micro 201 doesn't need to be read by the application to perform the encrypt operation. In fact, the secure micro firmware does not even allow that key to be read to make sure that it is kept secure. The connection to the Main CPU 205 is encrypted using hardware-based encryption keys and algorithms.

Main CPU 205: Main processor managing all functions of the module.

Device interface 206: USB or NFC interface to the computer or other device 102. All communication over this interface is securely encrypted. The interface may provide a video feed to a display 103 of the device 102. It also may provide for receiving input from the device 102 (e.g., touchscreen, touchpad, mouse, or keyboard input). The interface 106 may support multiple connections for distinct purposes.

Keyboard interface 208: Connection to a user interface device, typically the keyboard 104.

HMDI interface 210: Allows the user to enter important passwords and keys in off-line mode using a UI (user interface) 211 that is generated by the Main CPU 205 and displayed on a TV or other external monitor 212. In some embodiments, the UI 211 may be displayed at the computer 102 for entering an access code, selecting a password name, etc. as further discussed below.

The security module 100 also includes a code display 214, which is further discussed below.

Applications running on the computer 102 that are using a remote network service can use the security module 100 for the following services:

Secure password entry: When the server 106 requests a password for authentication of the network service, the application running on the computer 102 invokes the security module 100 for password entry from the keyboard 104 or from the module's password manager to securely send the password to the server. Because the computer 102 is an untrusted device, the security module 100 is designed such that neither the password nor the password hash is accessible by the computer 102 or by any eavesdroppers on the connection to the server 106. As further discussed below, this is accomplished by the server 106 providing to the security module 100, via the application running on the computer 102, a 'server nonce' that a) alerts the security module 100 to start encrypting data from the keyboard 104 and b) is used by the security module 100 to encrypt the data from the keyboard 104. The server 106 stores only the password hash. The password itself is stored only in the secure micro 201 along with a password hash made using the same salt used by the server 106 (e.g., a combination of the server domain with the username). The server doesn't know what the original password is. This is useful because most users use the same or similar passwords for different sites. The password hash is hashed again with a nonce value in order to prevent a "replay" attack. In a replay attack the attacker captures a response and reuses the captured response as a later time to gain access. The nonce sent by the server 106 to the security module 100 will change the expected response each time.

Two-factor authentication (TFA): The security module 100 has tamperproof module-unique keys programmed in its secure micro 201 at manufacturing. The server 106 uses a protocol based on these programmed unique keys to verify that the user of the computer 102 has access to a specific security module 100. The authenticating is done between the secure micro 201 of the security module 100 and the server 106 using the computer 102 as a "dumb" relay. The result is that the server 106 can verify two things about the user: 1) Something that the user knows (password entered from the keyboard 104 via the security module 100, or retrieved from the password manager 203 of the security module 100) and 2) something the user owns/has which is in this case the security module 100 itself. Details of the TFA protocol supported by the hardware module are further discussed below. The universal security module concept allows future enhancement to verify other things: For example, something that the user 'is,' such as a fingerprint or other biometric identifier.

Network link security: Because the computer 102 is assumed untrusted, an application running on the computer can use the security module 100 as a proxy to make the secure connection with the server 106. The advantage is that on the computer, only the connection to the security module (e.g. USB) needs to be secure, which limits the attack surface of a potential hacker and therefore simplifies the security requirements for the computer software developers and computer manufacturers. Additionally, the security module can use symmetric keys to establish a quantum computer secure connection, which is particularly useful if the information sent over the connection must be kept secure beyond the time in the future when quantum computers are expected to be able to decrypt all currently used PKI cryptographic algorithms. More details on link security are further discussed below. It is worth noting that in one or more embodiments, a password is entered and stored on the security module while it is in off-line mode (not connected to a computer). Assume that the user entered a list of passwords each labelled with a name into the module while in off-line mode, and at a later time the user wants to use the password labelled 'bank' to connect to his or her bank's secure website on a computer with an integral keyboard. Instead of typing the bank's password, the user logs into the device using a PIN code and selects the password labelled "bank." To prevent the PIN code being logged by a keylogger, the user enters the offset from a random number instead.

Using a PIN code is secure as long as the user has a limited number of attempts to do this. The result is that a keystroke logger would get no information about the actual password or the PIN code. The only information that the logger could get is that a password labelled "bank" was used.

Password and key management: Password(s) and key(s) are entered off-line and stored in the tamper-proof memory of the secure micro 201 embedded in the security module 100. The passwords and keys are tagged with a string (name). The tagged passwords and keys can securely be used by applications on multiple devices. The result is that the user can securely authenticate on the network service from any (including untrusted) computer using the security module 100.

Figure 3:
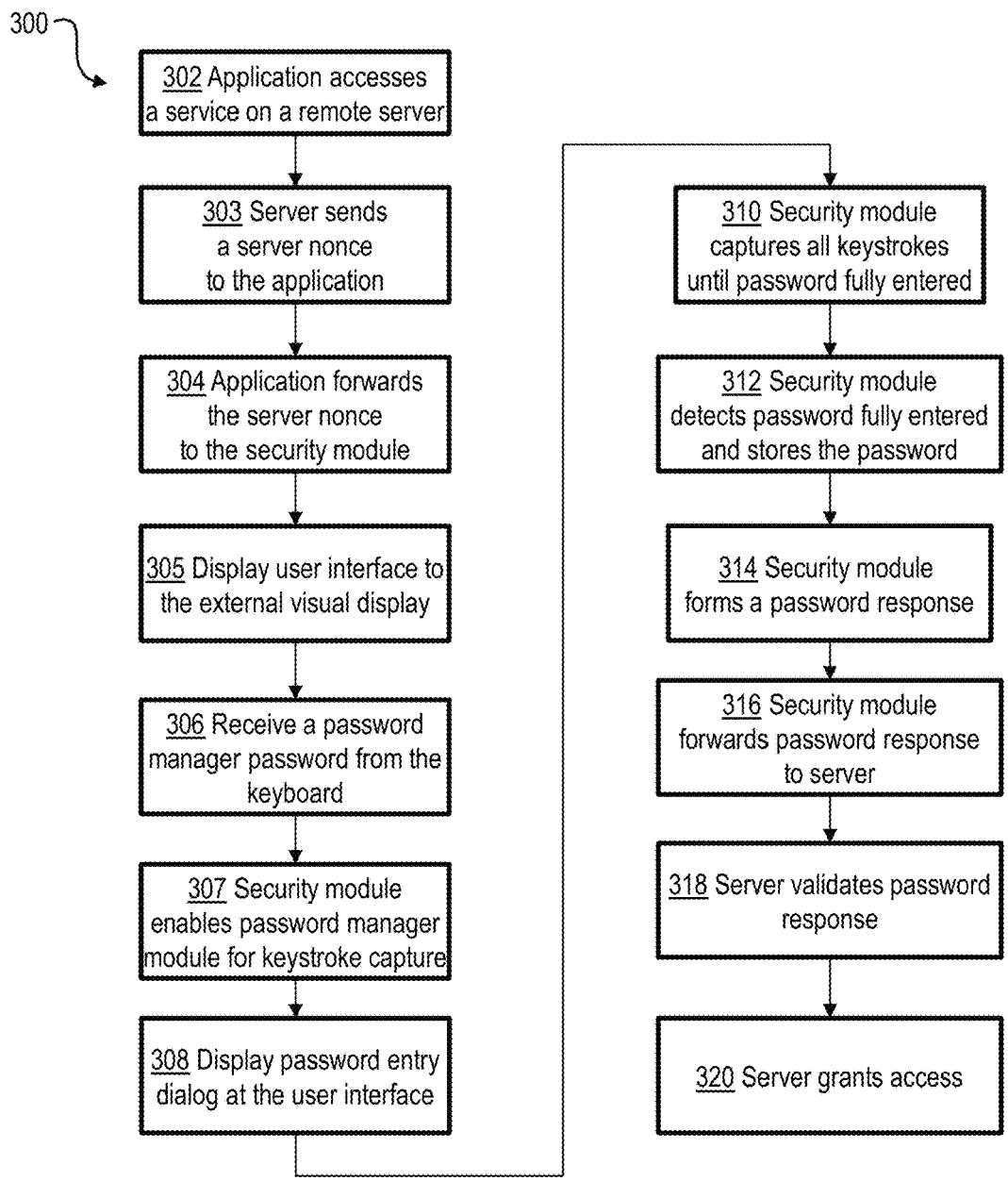
FIG. 3 shows in a schematic an algorithm for providing a password response from a security module to a server using an external keyboard connected to the security module, according to an exemplary embodiment.

Security module based secure password authentication: A goal of some embodiments of the security module secure password authentication is that the computer which is assumed untrusted will never see any characters of the password or the password hash. Separate keyboard password entry: For embodiments in which the keyboard 104 is separate from the computer 102 and is connected to the computer 102 via the security module 100, the password authentication protocol 300 works as shown in FIG. 3: At 302 an application on the computer accesses a service on a remote server 106 that requires secure password authentication. At 303 the server 106 sends a 'server nonce' to the application. At 304 the application forwards the server nonce to the security module 100. At 305, the security module 100 displays the user interface 211 to the external visual display 212. At 306, the security module 100 receives a password manager password from the keyboard 104. At 307, in response to receiving the password manager password and the server nonce, the security module 100 enables keystroke capture. At 308, the security module 100 displays a password entry dialog at the user interface 211. At 310 the security module captures all characters from the keyboard 104 until the password is fully entered. At 312, for example in response to an end-of-line character from the keyboard 104, the security module 100 detects that the password has been fully entered and stores the password. At 314 the security module 100 forms a password response by encrypting (hashing) the captured characters with a salt and then with the server nonce, using for example the logic 400 shown in FIG. 4. At 316 the security module 100 forwards the password response through the application to the server 106. In an exemplary embodiment, the server stores the password hash. Hashing the password means that the server doesn't know what the original password is. This is useful because most users use the same or similar passwords for different sites. The advantage of hashing the password hash with a nonce value is that this will prevent a "replay" attack. In a replay attack the attacker captures a response and reuses the captured response as a later time to gain access. The nonce generated by the server will change the expected response each time.

Figure 4:
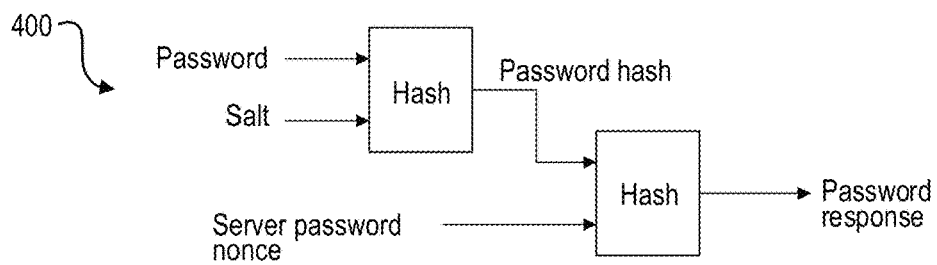
FIG. 4 shows in a schematic a process for generating a password response, according to an exemplary embodiment.

The server 106, which has a copy of the password hash, verifies the password response at 318 by duplicating the logic 400 of FIG. 4, i.e. by hashing its copy of the password using the same salt as the security module used, then hashing that password hash using the server nonce, and comparing the second result to the security module's password response. In FIG. 4, the word salt is effectively not a random number but rather a predefined value. It would/could for example be derived from the server domain and the user name. The usage of this value is however optional. At 320, once the password response is verified the server 106 grants access to the client.

Security module password manager (integral keyboard password retrieval): For embodiments in which the computer 102 does not have a discrete keyboard 104, i.e. the keyboard is an integral component of the computer, then the security module 100 has a password manager that allows off-line entry of passwords into the security module and secure on-line delivery of passwords from the security module to the server 106 via the computer 102. In the off-line mode, the security module 100 is connected to the keyboard 104 and to a monitor/TV 212 and is powered by a battery or externally. The Main CPU 205 displays the UI 211 to the monitor/TV 212. A user enters an access code for the security module 100 using the keyboard 104 and then uses the keyboard 104 and the UI 211 to add passwords to the password manager and to tag each password with a corresponding string (e.g., a username). A different method of entry for the access code in the on-line mode, using the computer 102, is further discussed below with reference to FIG. 5.

Figure 5:
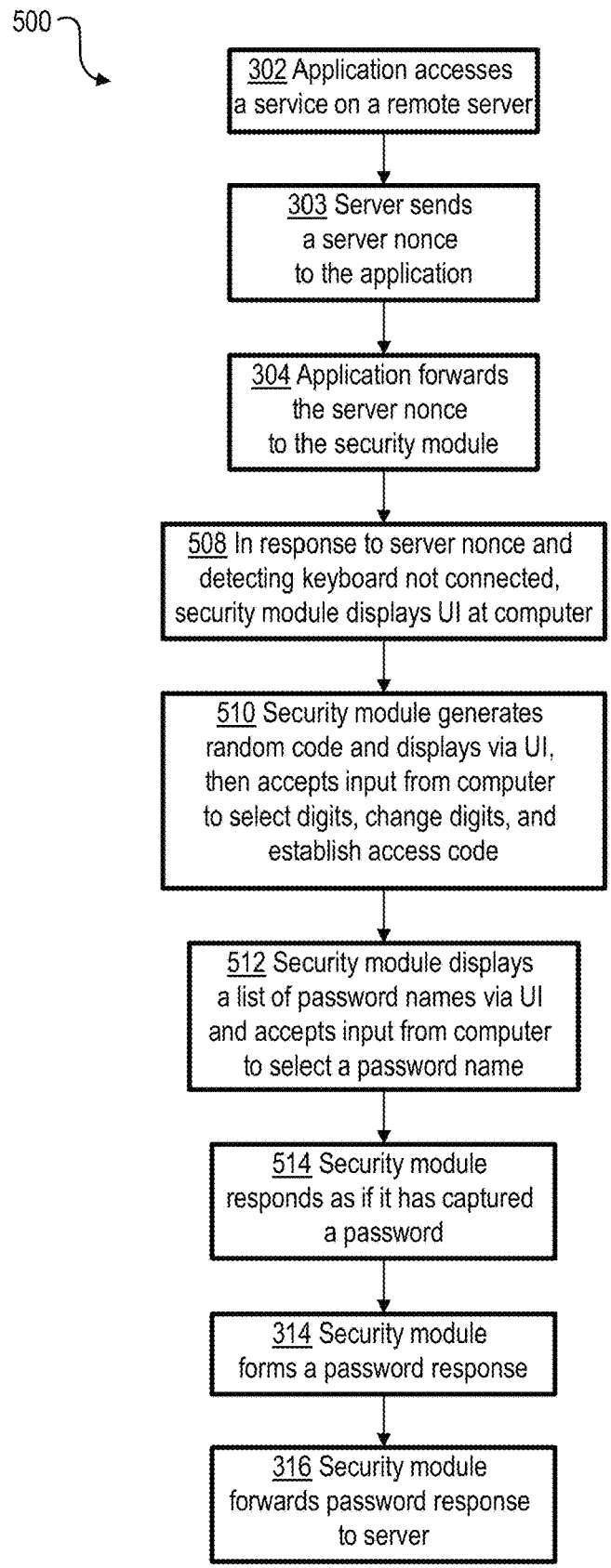
FIG. 5 shows in a schematic an algorithm for providing a password response from a security module to a server when using an internal keyboard of an insecure device, according to an exemplary embodiment.

FIG. 5 depicts a flow chart 500 showing operation of the security module 100 in the on-line mode with a computer 102 that has an integral keyboard. At 302, an application running on the computer 102 contacts a service on a remote server 106 that requires secure password authentication. At 303 the server 106 sends a 'server nonce' to the application. At 304 the application forwards the server nonce to the security module 100. At 508, in response to receiving the server nonce, and detecting that the keyboard 104 is not connected, the security module 100 displays its password manager UI 211 via the computer 102. The first screen of the password manager UI 211 is for entry of the access code. Three (or other predetermined number of) wrong access code entries will lock the password manager, which then can be unlocked only by using the master password of the security module from the keyboard 104 (not from the computer 102).

Figure 6:
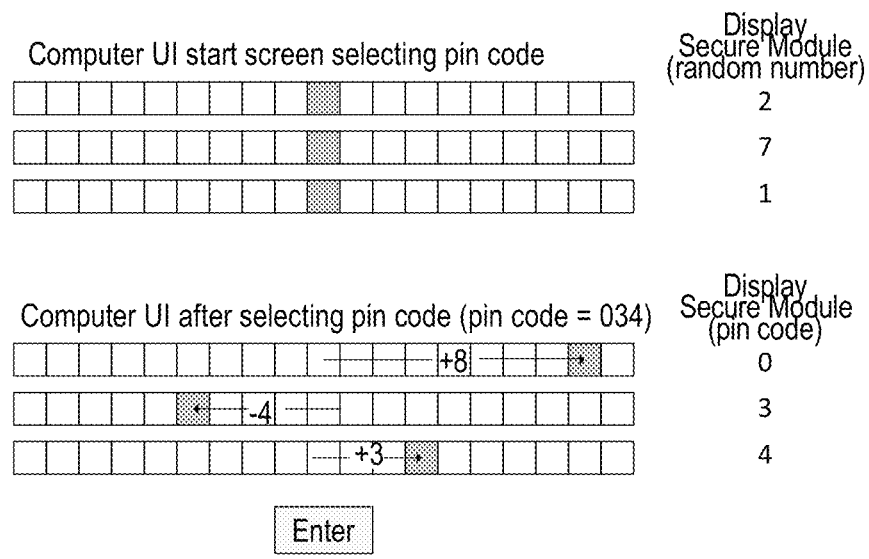
FIG. 6 shows in a schematic a process for securely entering an access code using an insecure device, according to an exemplary embodiment.

Secure mechanism to enter an access code from an unsecure device (computer 102): In one or more embodiments, the security module 100 has a small display 214 (shown in FIG. 1), on which it can show the access code. Alternatively, the access code can be displayed as a pixelated image (not as plain character text) at a display of the computer 102. The access code can be securely entered from the insecure computer 102 by the following sequence of operations (FIG. 6 shows an example with a 3-digit access code 034).

At 510, the security module 100 generates a random code (271 in the example of FIG. 6) and shows this on its code display 214 or via the display of the computer 102. The access code application running on the security module 100 accepts simple keyboard input (e.g., arrow keys) from the computer 102 to a) select a digit of the random code and b) change a selected digit to c) establish the correct access code. In the example shown in FIG. 6, the random '2' is moved+8 to create a 0 (9 rolls over to 0), the '7' is moved −4 to create number 3, and the '1' is moved+3 to make 4). When a number is changed by the keyboard input from the computer 102, the security module 100 will briefly send, to the display 214 or to the computer 102, pixels for the changed number followed by pixels for an asterisk to hide the actual access code. When the correct access code has been established by changing digits of the random code, the security module 100 proceeds to the next step. The access code is entered securely because the computer 102 does not "know" the initial random code that was generated by the security module 100. In one or more embodiments, in which the user gets a limited number of attempts to match the code, changes to the random code can be locked or committed by an input from the computer 102 or other insecure device and it is after locking the changes that the random code gets compared to the access code. In other embodiments, comparisons of the random code to the access code occur each time a digit is changed, and there is no maximum number of attempts. In one or more embodiments, once a subsequent digit of the random code has been selected to be changed, a previously selected digit no longer can be selected; if a digit is changed to a wrong value and then a subsequent digit is selected, the user must entirely exit or otherwise start over again.

At 512, having received the access code, the security module 100 displays a list of password names on the computer 102. Again, the security module 100 accepts simple keyboard input (e.g., arrow keys or initial letters plus arrow keys) from the computer 102 to select a name from the list. Thus, once the access code has been entered, an application running on the computer 102 can use the password name instead of typing the full password in the password authentication process described above.

At 514, selecting a password name causes the security module 100 to behave as if it has fully captured a password from the keyboard 104, i.e. it proceeds to implement step 314 of producing a password response (according to the logic shown in FIG. 4) and step 316 of sending the password response to the server. Then the server, which has a copy of the password hash, verifies the password response by duplicating the logic of FIG. 4, i.e. by hashing its copy of the password using the same salt as the security module used, then hashing that password hash using the server nonce, and comparing the second result to the security module's password response.

Security module password exchange with server: To set or reset the password on the server, the application sends a request with the server's password set/reset URL to the security module. The security module creates a new secure connection between the module and the server using the computer as relay, hashes the password using a salt based on, e.g., the server domain and the username, and sends the password cryptographic hash (e.g. SHA3_256) to the server 106, which stores the hash for later comparison. Note: In one or more embodiments, the password itself is never shared. Many people use the same password or simple derivations of a password for different websites. Hashing the password before sending it to the server has as its purpose that the server does not have access to the original password. The 'salt' value further obfuscates the password.

Figure 7:
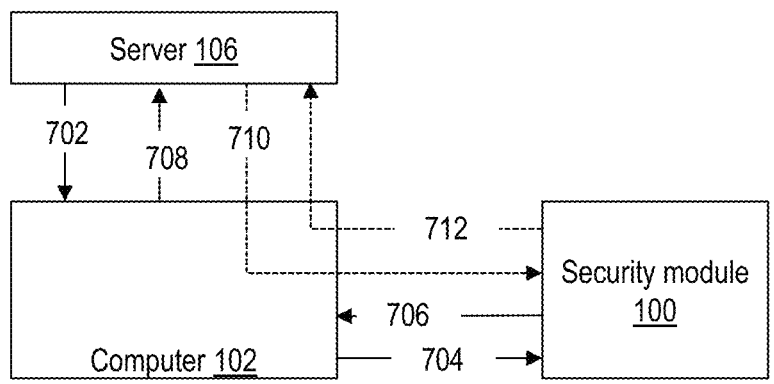
FIG. 7 shows in a schematic some steps of a two-factor authentication (TFA) process according to an exemplary embodiment.

Security module Two-Factor Authentication (TFA): FIG. 7 shows simplified steps involved in a TFA process. At 702, the server 106 requests TFA and provides a server challenge (and other info) to the computer 102. At 704, the computer 102 forwards the request to the security module 100. At 706, the security module 100 calculates a TFA response and sends it to the computer 102. At 708, the computer 102 forwards the TFA response to the server 106.

The server 106 can use two-factor authentication in two ways:

1) Asymmetric key based TFA. At 708, the security module 100 provides to the server 106 as its TFA response a certificate for a unique key that was programmed in the secure module at manufacturing time. That is, the module is provisioned at manufacturing time with a certificate and associated private key. (The private key is stored in the secure micro.) Then, at 710, the server sends a challenge encrypted with the certificate key to the security module 100 via the computer 102. The security module 100 uses its private key to decrypt the challenge and at 712 returns the result to the server 106 via the computer 102. This TFA mechanism works for any server but is not quantum computing secure and requires a total of eight data transfers among the three components. In an exemplary embodiment, the TFA uses a standard browser certificate bundle that enables the keys used by the vast majority of servers. In a non-limiting example, The TFA could for example work in the following way: the module sends the certificate which includes the public key to the server; the server encrypts a random value with the public key (challenge); the server sends the challenge to the module; the module decrypts the challenge and generates a response based on the decrypted value; the server verifies the response; and the TFA is complete. Because the certificate is part of the trusted chain the server can trust the device if it sends the correct response.

2) Quantum-secure TFA. A network service company that requires TFA requests a database of keys for all HW modules from the security module's OEM. The OEM assigns a unique vendor ID to each company and for each vendor ID generates a list of K1 keys corresponding to the different security modules. Because the vendor ID is different, the lists of K1 keys are unique for each company. When the network service's server 106 requests TFA, at 702 it will provide a server challenge value and the vendor ID to the security module 100 via the computer 102. At 706, the security module 100 calculates the TFA response (see FIG. 8) and returns that response via the computer 102 back to the server 106, which can verify that the response is correct and can only have come from a specific security module. This authentication mechanism is significantly faster than the asymmetric key based TFA (four fewer or half as many data transfer steps, plus symmetric key cryptography is faster than asymmetric key cryptography) and is quantum computing secure (key-ladder engine is based on AES256).

Figure 8:
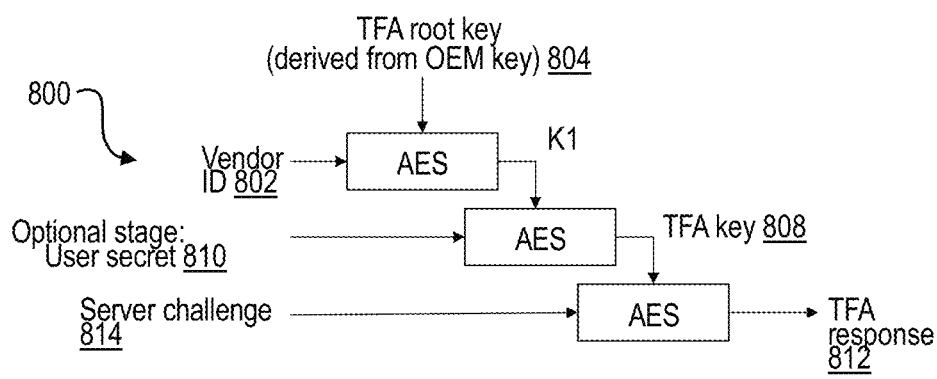
FIG. 8 shows in a schematic an algorithm for calculating a TFA response for use in the process of FIG. 7, according to an exemplary embodiment.

FIG. 8 shows an exemplary algorithm 800 for calculating a TFA response 812 to be used in the TFA scheme of FIG. 7. The algorithm 800 produces K1 by encrypting a vendor ID 802 of the server 106 using a TFA root key 804 derived from the server's OEM key. Then (optionally) the algorithm 800 produces a TFA key 808 by encrypting a user secret 810 (previously shared with the server) using K1. Then the algorithm 800 produces the TFA response 812 by encrypting a server challenge 814 using the TFA key 808 (alternatively, using K1 in case the optional step was omitted).

Figure 9:
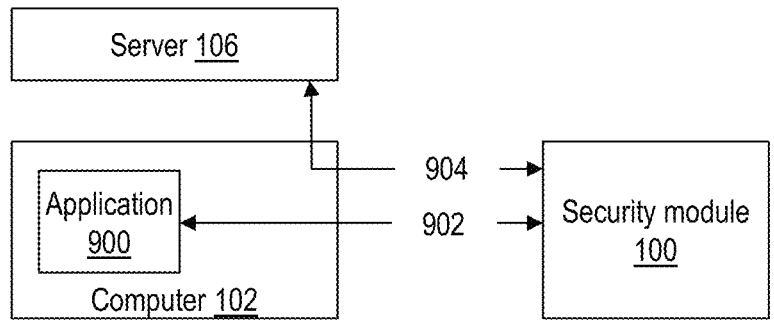
FIG. 9 shows in a schematic use of a security module as a proxy between a computer and a server according to an exemplary embodiment.

Security module secure link: As shown in FIG. 9, an application 900 that is running on a computer 102 and wants to create a secure connection to a server 106 using the security module 100 as proxy sets up two connections: a secure connection 902 between the security module 100 and the application 900, and a secure connection 904 between the server 106 and the security module 100 using the computer 102 as a relay. Because the data on connection 904 is encrypted with a key shared by the server 106 and the security module 100, the computer 102 cannot "read" the data it relays.

The data sent from the computer 102 to the server 106 has the following flow: the data goes first from the application 900 on the computer 102 through connection 902 to the security module 100; then the security module 100 encrypts the data with a session key and sends that encrypted data back to the computer 102, which forwards the encrypted data to the server 106. Data sent from the server 106 to the application 900 follows the same flow but in reverse order. This usage is typically not to protect a password, but to protect data being transferred to the server. The advantage of this usage is that a) only one connection (the connection to the secure module) on the "untrusted" computer needs to be secure; and b) it can create a quantum computing secure link to the server if that is required.

The connection between the server 106 and the security module 100 can be made quantum computer secure by using a symmetric key based shared secret exchange, as described next, to generate an AES256 session key.

Symmetric Key Based Shared Secret Exchange (SKSSE) Overview

SKSSE Key Overview

In one or more embodiments of the security module 100, a symmetric key based shared secret exchange (SKSSE) between two entities A(Alice) and B(Bob) (i.e. the security module 100 and the server 106) uses a trusted authority (TA or T). The SKSSE relies on shared symmetric key(s) between the TA and A and between TA and B. The SKSSE process uses a combination of fixed keys and rolling keys to guarantee forward and future security.

The TA shares one symmetric rolling key with A and a different symmetric rolling key with B. A and B use the two rolling keys together with the TA to securely share values between A and B (e.g., to share symmetric obfuscation keys for other information). The SKSSE protocol goal is for A and B to create a shared secret (binary data).

Figure 10:
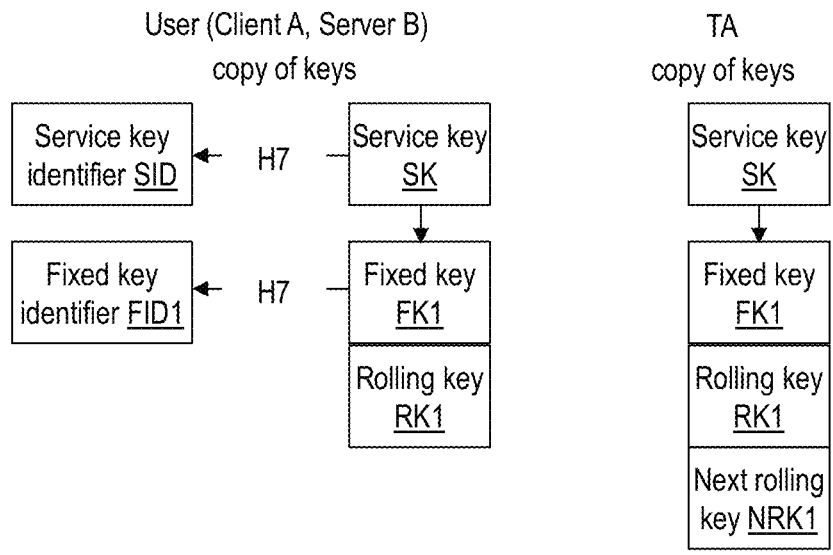
FIG. 10 shows an overview of keys for using the security module as a proxy according to FIG. 9.

FIG. 10 shows an overview of the keys that are involved. To secure the connection between the user (A or B) and the TA, both the TA and the user can have an identical copy of the keys used in the exchange.

Some Functions of the Keys:

Rolling key (i.e. RK1, corresponding to RKA, RKB): Key that changes for every shared secret exchange. Previously used rolling keys are discarded which guarantees the forward security requirement. The next rolling key is derived from both the previous rolling key and the fixed key which guarantees future security unless both the fixed and rolling key are compromised.

Fixed key (e.g., FK1): The fixed key is used in generating the rolling keys. Because this key doesn't change, it is more sensitive from a security point of view; accordingly, in one or more embodiments the fixed key is stored only in a hardware security module (HSM) device that carries out cryptography using the key but doesn't allow read back of the key by outside applications. It is worth noting that in one or more embodiments the OKA and OKB are random values generated by the A and B to prevent the TA from having access to the SVA and SVB and as result the Shared Secret.

Service key SK: This is the main service key, which is used to generate the fixed/rolling (F/R) key pair and is used to identify/authenticate the user. To authenticate a user (e.g. server) response a SID (service key identifier) in a trusted certificate chain is required. This certificate chain function works identical to the widely used X509 based certificates. The Service key does not change and should therefore be kept securely in an HSM that doesn't allow read back of the key by outside applications.

Next rolling key (e.g., NRK1): During the SKSSE process a new rolling key is generated for the particular security module or server (user). The TA keeps a copy of this new rolling key in persistent memory to make sure that the Fixed/Rolling key pair can stay synchronized between TA and user (A or B) if the process is aborted/terminated before it completes.

Pool of Fixed/Rolling keys: The SKSSE process takes a certain amount of time to complete, which can be quite long in case of network or other problems. During the SKSSE process the Fixed/Rolling (F/R) key pair cannot be used for any other SKSSE based connections as that could result in key synchronization problem between TA and the user. A pool of F/R key pairs allows running multiple SKSSE processes at the same time.

Advantages of the SKSSE protocol include:

Forward secrecy: Shared secrets generated in the past are not compromised if at some point a shared secret or keys from a user (A or B) or T are compromised.

Future secrecy: A compromised shared secret exchange between B and T and A and T will not compromise future shared secret exchanges.

Easy to extend the TLS v3 protocol to support SKSSE Quantum computing secure.

SKSSE Protocol Details

Figure 11:
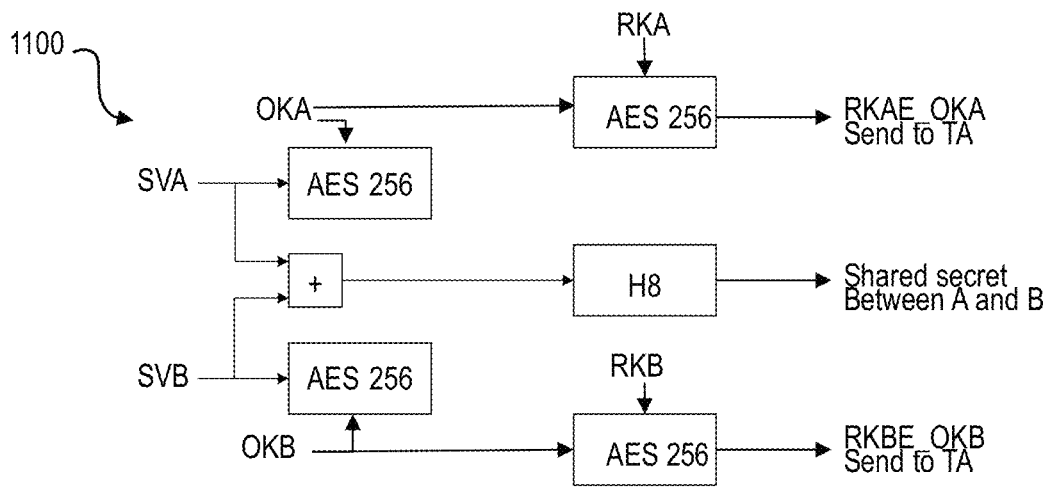
FIG. 11 shows in a schematic a symmetric key based shared secret exchange protocol according to an exemplary embodiment.

FIG. 11 shows a schematic of the SKSSE protocol 1100. According to the protocol 1100, client A (security module 100) and server B (server 106) each generate a respective random Secret Value (SVA and SVB) and a respective random Obfuscation Key (OKA and OKB). The shared secret is the concatenation of SVA and SVB hashed with H8 (discussed below with reference to FIG. 17). The shared secret can be made only if both A and B have access to values SVA and SVB. To securely get SVA to server B and SVB to client A requires a trusted authority (TA) that independently shares keys (RKA and RKB) with A and B. Key RKA enables a secure exchange of data between A and TA and key RKB enables a secure exchange of data between B and TA.

Figure 12:
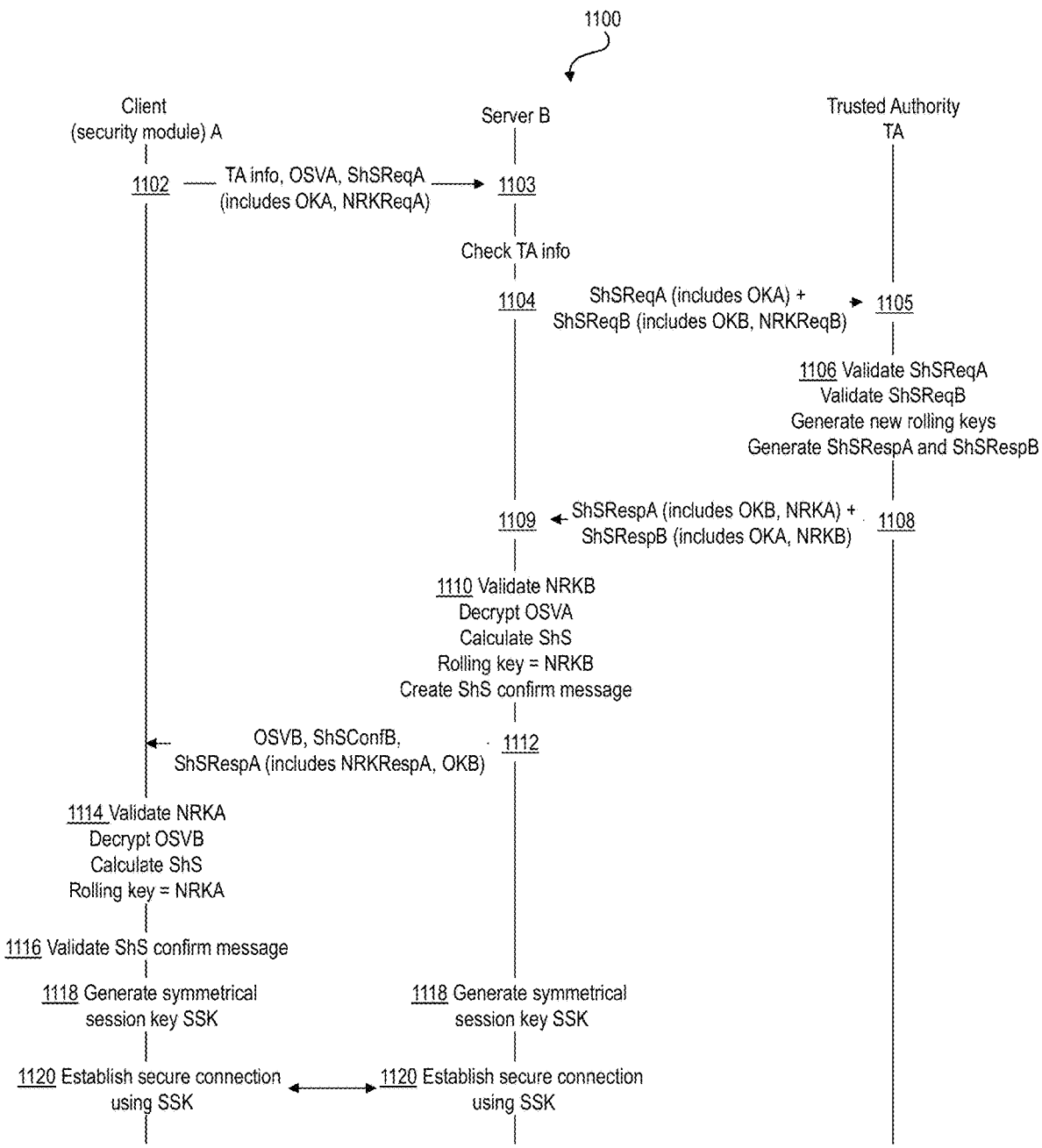
FIG. 12 shows in a schematic a dataflow of the protocol shown in FIG. 11.

FIG. 12 shows a dataflow of the SKSSE protocol 1100. At 1102, the security module 100 ("A") starts the process. A generates an authenticated and partially encrypted shared secret request message ShSReqA using a rolling key RKA that is shared by A and T. Nobody else (including B) has this shared key. ShSReqA contains a symmetric obfuscation key (OKA see FIG. 9) that is encrypted by RKA. A sends ShSReqA to the server 106 ("B") for delivery onward to the TA.

SKSSE Message Formats

In one or more embodiments, hashing algorithm H8 is effectively a combination of two hashing algorithms. The first stage is an SAH3_512 algorithm that outputs a 512 bit hash. The 256 least significant bits of the hash are used as key for an AES256 encrypt operation. In the H8 case, the 256 most significant bits are used as input data to the encrypt operations.

Acronyms: H7=128 bit hash; H8=256 bit hash; H9MAC (K,M)=512 bit hash MAC (message authentication code) over message M using key K; AES(K, M)=AES256 encrypted message M using key K; RKx=Rolling Key A or B; SessID=Session Identifier.

Shared secret request message formats.

Message format for ShSReqA=H9MAC(RKA, typeShSReqA+FIDA+SessID+AES(RKA, OKA)+NKReqA). In other words, the message format for requesting a shared secret for client A is a 512-bit hash message authentication code by client A's rolling key RKA of a marker typeShSReqA that shows the Type of message is a shared secret request; the client A fixed key ID FIDA; a session identifier SessID, which can be different than the ShSReqX value of SessID; an AES encryption by RKA of OKA, client A's obfuscation key; and a request for client A's next rolling key RKA.

Message format for ShSReqB=H9MAC(RKB, typeShSReqB+FIDB+SessID+AES(RKB, OKB)+NKReqA+ShSReqA). In other words, the message format for requesting a shared secret for server B is a 512-bit hash message authentication code by server B's rolling key RKB of a marker typeShSReqB that shows the Type of message is a shared secret request; the server B fixed key ID FIDB; a session identifier SessID, which can be different than the ShSReqX value of SessID; an AES encryption by RKB of OKB, server B's obfuscation key; the request for client A's next rolling key RKA; and client A's shared secret request ShSReqA.

SKSSE Protocol Details

At 1104, the server 106 ("B") combines ShSReqA with its own version of the shared secret request message ShSreqB. B's ShSReqB contains an obfuscation key (OKB). B authenticates and encrypts the combined message with a rolling key (RKB) that is shared only by B and T, then sends the authenticated combined message to TA.

At 1106, the TA validates and decrypts the combined request and generates responses for A and B. The response for B contains OKA, decrypted and re-encrypted with a next iteration NRKB of the B-T shared rolling key, correspondingly the response for A contains OKB, decrypted and re-encrypted with a next iteration NRKA of the A-T shared rolling key. Note: The rolling key changes every exchange and the TA response will generate and use the next rolling key to re-encrypt the OKA.

Shared secret response message formats.

Message format for ShSRespA=H9MAC(RKA, typeShSRespA+FDA+SIDB+SessID+AES(RKA, OKB)+NK-RespA). In other words, the message format for a shared secret response to client A is a 512-bit hash message authentication code by client A's rolling key RKA of a marker typeShSRespA that shows the Type of message is a shared secret response; the client A fixed key ID FIDA; a marker SIDB, identifying server B's service key; a session identifier SessID, which can be different than the ShSReqX value of SessID; an AES encryption by RKA of OKB; and the TA response message to client A that includes the next rolling key RKA.

Message format for ShSRespB=H9MAC(RKB, typeShSRespB+FIDB+SIDA+SessID+AES(RKA, OKA)+NK-RespB+ShSRespA). In other words, the message format for delivering a shared secret response to server B is a 512-bit hash message authentication code by client server B's rolling key RKB of a marker typeShSRespB that shows the Type of message is a shared secret response; the server B fixed key ID FIDB; the client A service key identifier SIDA; a session identifier SessID, which can be different than the ShSReqX value of SessID; an AES encryption by RKB of OKA, client A's obfuscation key; a response with server B's next rolling key RKB; and ShSRespA.

SKSSE Protocol Details

At 1108, the TA sends the authenticated combined response back to B. At 1110, server B extracts OKA by decrypting the combined response with NRKB, then generates SVA by decrypting OSVA with OKA and generates a shared secret from SVA and SVB. At 1112, server B forwards to A the response from the TA and attaches to the response OSVB and a confirmation message authenticated with the shared secret. At 1114, security module A extracts the OKB by decrypting the TA response message with NRKA, then generates SVB by decrypting OSVB with OKB and calculates the shared secret based on SVA and SVB. At 1116, security module A verifies that the confirmation message is authenticated with the shared secret. This concludes the symmetric key based shared secret exchange.

At 1118, A and B then both separately use the exchanged shared secret, optionally in combination with other shared secrets (e.g. ECDH, RSA or additional SKSSE), to generate a symmetrical session key SSK. Because the session key is based on the same shared secret, e.g., by hashing the shared secret using a common salt, both A and B generate identical versions of the session key. For example, the session key can be derived from the shared secret using a predefined algorithm (for example a hash) the output of that output will always be the same using the same shared secret. At 1120, the device A and the server B then establish a secure connection using SSK to encrypt all traffic.

Notes

In one or more embodiments, A does not send a separate shared secret confirmation message to B. The confirmation automatically happens when A sends data encrypted with the session key which is derived from the shared secret and B is able to decrypt the data.

To guarantee that the SKSSE process is quantum computing secure for the foreseeable future it can use 256-bit (or more) size encryption keys (e.g. AES256) and a 512-bit (or more) hash algorithm (e.g. SHA3_512).

Symmetric Key Infrastructure (SKI)

Trusted Authority (TA) SKI

In one or more embodiments, the TA keeps a copy of the keyset shown in FIG. 11 for each security module and server. In one or more embodiments, the security modules also store their respective keysets.

Figure 13:
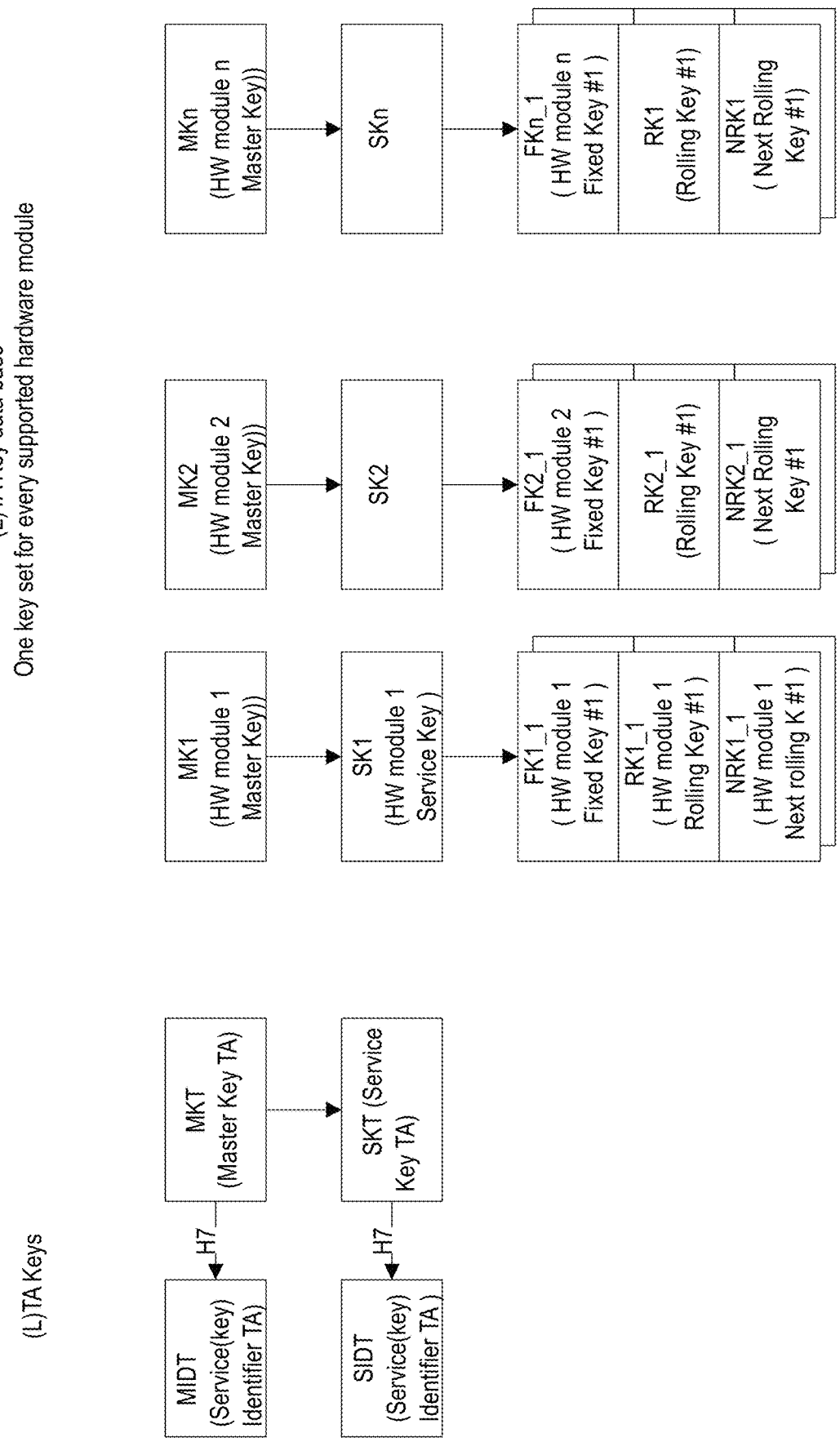
FIG. 13 shows in a schematic an overview of trusted authority keys and a database with the keyset for every hardware module.

FIG. 13 shows an overview of the TA keys and of the TA database with keysets for every hardware module. The TA keys include a service key identifier MIDT, a master key MKT, a service key SKT, and a service key identifier SIDT. The keyset for each hardware module 1, 2, . . . , n includes a master key MK1, MK2, MKn, a service key SK1, SK2, SKn, a fixed key FK1_1, FK2_1, FKn_1, a rolling key RK1_1, RK2_1, RKn_1, and a next rolling key NRK1_1, NRK2_1, NRKn_1.

Note: The SKSSE protocol allows creating local trusted authorities (LTA). An LTA can be hosted on the same hardware or in the same network as a server, reducing network latency and reducing the load on the TA.

Hardware Module SKI

Figure 14:
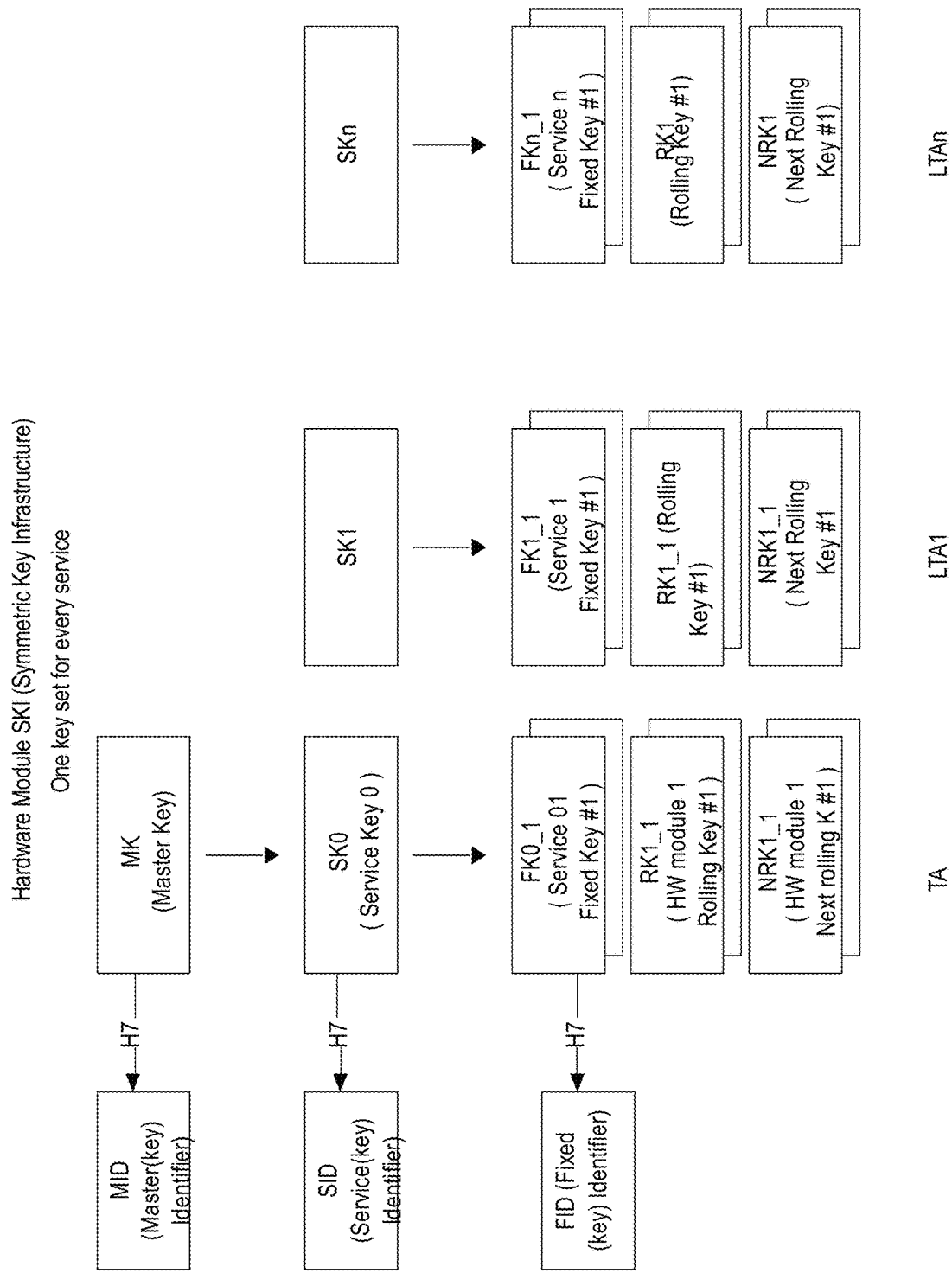
FIG. 14 shows in a schematic a security modules key infrastructure according to an exemplary embodiment.

FIG. 14 shows a security modules key infrastructure. At manufacturing of the hardware module at least two keys are preprogrammed; the Master Key (MK) and the Service Key 0 (SK0). MK has a master key identifier MID, and SK0 has a service key identifier SID. Other service keys (1, . . . , n) associated with a local trusted authority ("LTA") and all fixed and rolling keys (e.g., FK0, RK0, NRK0) can be generated after deployment. Each associated service has a corresponding set of service, fixed, and rolling keys, e.g., SK1, FK1_1, RK1_1, NRK1_1, SKn, FKn_1, RKn_1, SKn_1.

Server/Client Authentication

In order for the client (security module) A to authenticate the server B it needs a trusted certificate with the SIDB (Service Key Identifier for server B). This certificate is based on the X509 based certificates and trusted certificate chains. To speed up the exchange this certificate chain can be cached by the client.

The digital signatures used in the certificate chain can for now be RSA/ECDSA based signatures. If at some point in the future quantum computers are able to break the RSA/ECDSA then the digital signatures can be replaced by Merkle based digital signatures algorithm such as CMSS/GMSS or some other NIST approved quantum computing secure digital signature algorithm.

For mutual authentication, for a server to authenticate the client requires a trusted certificate with the SIDA (Service Key Identifier client A), which is similar to the server certificate requirements.

Add, replace and remove keys on the trusted authority

Figure 15:
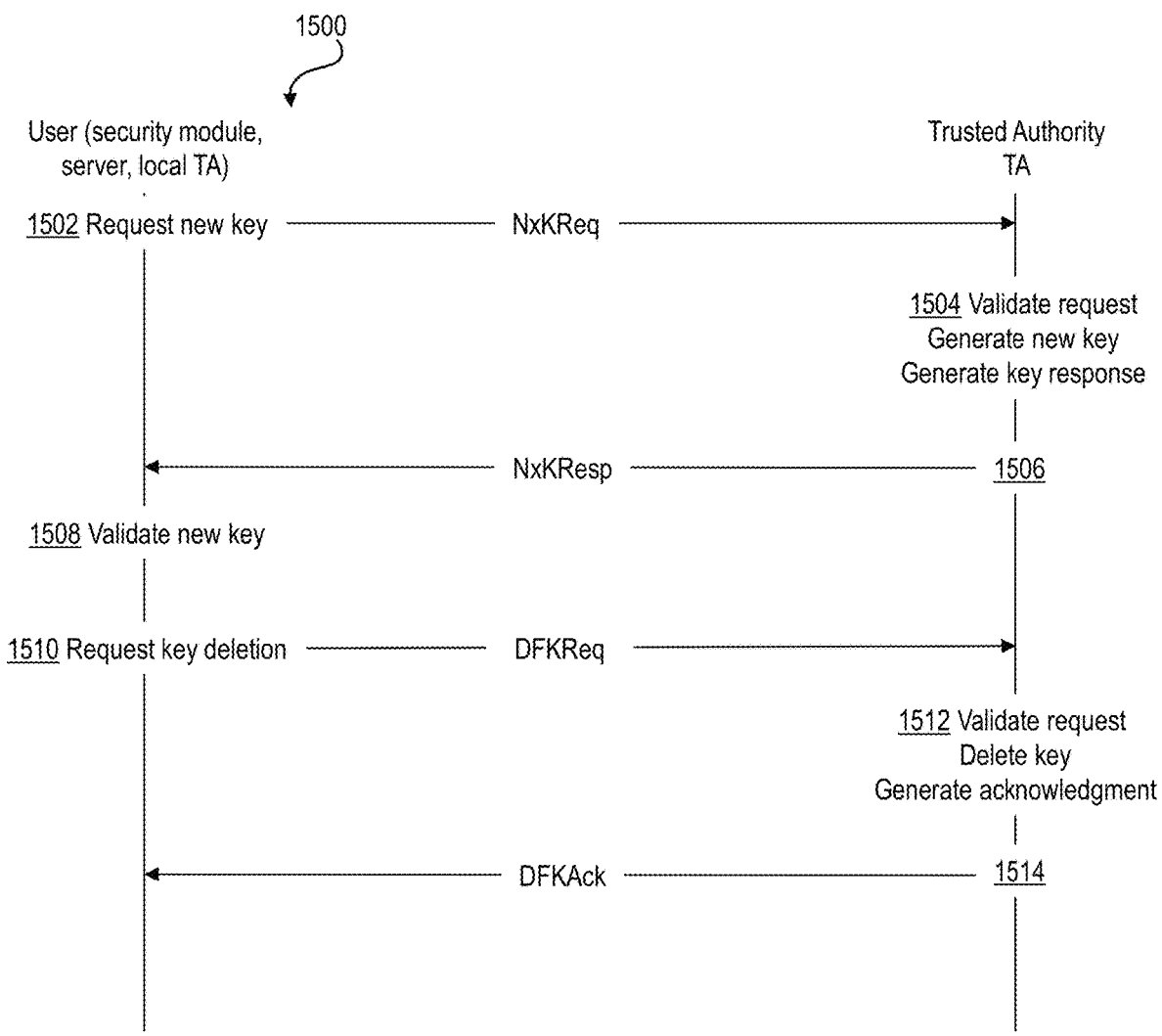
FIG. 15 shows in a schematic some dataflows for adding, replacing, or deleting keys.

The SKSSE exchange depends on creating removing and replacing keys. FIG. 15 shows sequences 1500 for adding/replacing or deleting keys. Service keys and rolling keys can only be replaced on the TA. Fixed keys can only be added or removed. For example, at 1502 a user (e.g., a local trusted authority LTA) requests a new key (e.g., a new fixed key or rolling key) from the trusted authority TA with a message NxKReq. At 1504, TA validates the request, generates a new key, and generates a key response. At 1506, TA sends the key response NxKResp back to the user. At 1508, the user validates the new key.

As another example, at 1510 the user requests a key deletion by sending a deletion request message DFKReq. At 1512, TA validates the request, deletes the key, and generates an acknowledgment. At 1514, TA sends the acknowledgment DFKAck back to the user.

In one or more embodiments, to keep the protocol simple, the sequences do not include a confirmation back to the TA. This is only a problem for replacing the rolling key as this key depends on the previous version and can be kept in sync between the TA and the User. In one or more embodiments, to make sure that synchronization can be maintained, the TA always keeps the current and a next version of the rolling key in persistent memory. If the User missed the New Key Reponses message from the TA, then the User can simply retry with the same rolling key.

New key request message formats.

NxKReqA message format=H9MAC(RKA, typeNRKReq+FIDA+SessID+AES(RKA, NonA)). In other words, the message format for requesting a new key for client A is a 512-bit hash of client A's rolling key RKA together with a marker typeNRKReq that shows the Type of message is a New Rolling Key request; the client A fixed key ID FIDA; a session identifier SessID, which can be different than the ShSReqX value of SessID, and an AES encryption by RKA of NonA, a Nonce value that is generated by A and used by the Trusted Authority TA to generate the next rolling key from current rolling key RKA.

NxKReqB has the same format as NxKReqA, except with B in place of A.

New Key Response Message Formats

NxKRespA message format=H9MAC(NRKA, typeNRKResp+FDA+SessID+AES(RKA, NonT)). In other words, the message format for sending a new key back to client A is a 512-bit hash message authentication code by client A's next rolling key NRKA of a marker typeNRKResp that shows the Type of message is a key response; the client A fixed key ID FIDA; a session identifier SessID, which can be different than the ShSReqx value of SessID; and an AES encryption by RKA of the trusted authority T's nonce.

NxKRespB has the same format as NxKRespA, except with B in place of A.

Delete fixed key request message format.

DFKReq=H9MAC(SK, typeDFKReq+FIDA+SessID)

In other words, the message format for sending a new key back to client A is a 512-bit hash message authentication code by the service key SK of a marker typeDFKReq that shows the Type of message is a Delete Fixed Key request; the client A fixed key ID FIDA; and a session identifier SessID.

Delete fixed key acknowledge message format.

DFKAck=H9MAC(SK, typeDFKAck+FDA+SessID).

In other words, the message format for acknowledging that a fixed key has been deleted is a 512-bit hash message authentication code by the service key SK of a marker typeDFKAck that shows the Type of message is a Delete Fixed Key acknowledgment; the client A Fixed Key ID FIDA; and a Session Identifier SessID which can be different than the ShSReqX SessID.

TA new key generation

The TA can generate several different types of keys: Service Key (SK), Fixed Key (FK) or rolling key (RK).

Service Key 0 generation: $SKx0=H8(AES(MKx, Nonx+NonT))$. In other words, Service Key 0 for device x is a 256-bit hash of an AES encryption by device x's master key of the sum of device x's nonce plus the trusted authority T's nonce.

Fixed Key generation: $FKx=H8 (AES (SKx0, Nonx+NonT))$. In other words, the fixed key for device x is a 256-bit hash of an AES encryption by device x's service key of the sum of device x's nonce plus the trusted authority T's nonce.

Rolling Key generation: $NRKx=H8 (AES (FKx, Nonx+NonT+RKx))$. In other words, the next rolling key for device x is a 256-bit hash of an AES encryption by device x's fixed key of the sum of device x's nonce plus the trusted authority T's nonce plus device x's previous rolling key.

Notes: The Fixed key generation adds a new key, and therefore only the fixed key can be removed. When a fixed key is removed the associated rolling key is also deleted. The new rolling key generation is based on the previous version of the key.

Using a Local Trusted Authority

Using a TA located on a different external network adds additional network delay to the shared secret exchange and creates a significant load on the TA. To address these issues the SKSSE protocol allows creating local trusted authorities (LTA).

The LTA has a database with shared service keys between the clients (security modules) and the LTA.

Figure 16:
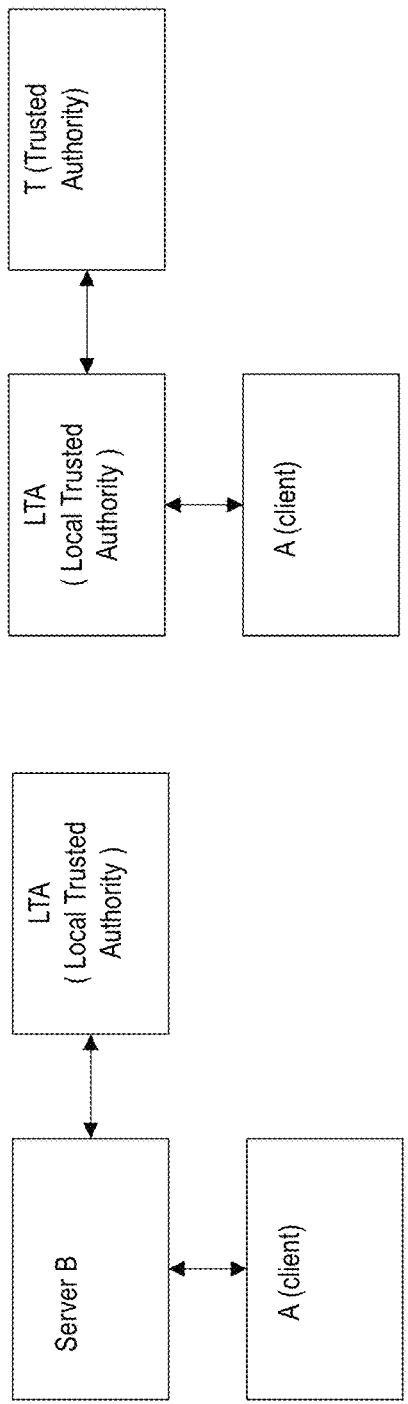
FIG. 16 shows in a schematic how service keys can be securely shared between a client, a server, and a local trusted authority according to an exemplary embodiment.

FIG. 16 shows a protocol 1600 for how service keys can be securely shared between users (client A and server B) and a local trusted authority LTA.

A shared service key between the LTA and client A (hardware module) is generated using the SKSSE protocol 1100 (shown in FIG. 12). LTA and A use the shared secret to set up a secure connection for exchanging the service key. For example, in a first step 1601, use the SKSSE to exchange a shared secret between LTA and A (B is replaced with LTA). LTA and A use this shared secret to set up a secure connection in which A can send a service key to the LTA in a second step 1602. Because the LTA is hosted in the same network (same company) as server B, it is assumed that the LTA also has the service keys for B. In a third step (not shown), the LTA has the service key of A and B and can therefore carry out the 'TA' function of the SKSSE protocol, and therefore allows A and B to setup a secure session using the shared secret from the SKSSE.

With the securely shared service key the LTA can perform the exact same function as a TA. The SKSSE protocol works identically with the LTA. Because the LTA is in the same network (or on the same device) as server B, it shares the service keys for B. Additionally, there is little to no network delay.

Algorithms

Figure 17:
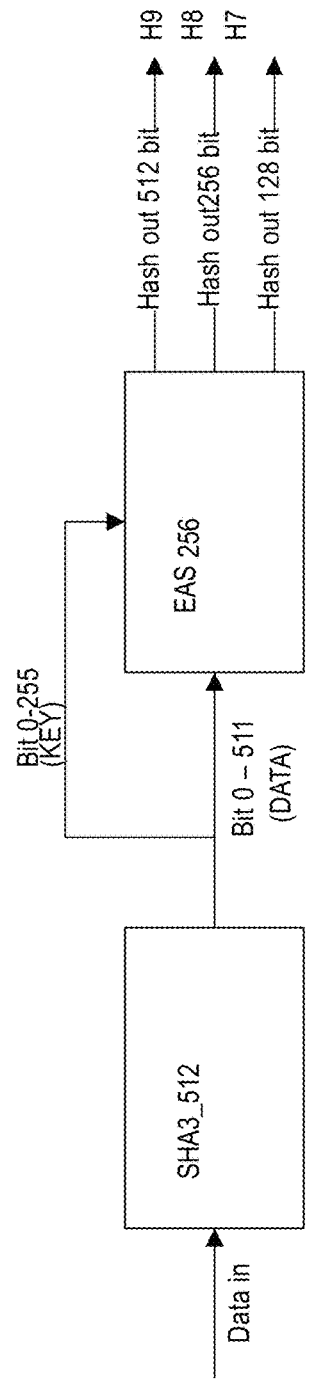
FIG. 17 shows in a schematic H7, H8 and H9 hashing operations according to an exemplary embodiment.

FIG. 17 shows a future proof hash algorithm using a combination of two independent quantum computing secure hashing algorithms. Data in is hashed by SHA3_512 algorithm, then all bits of the hash are encrypted by bits 0-255 using AES256. Bits 0-511 of the encrypted hash are taken as H9, bits 0-255 are taken as H8, and bits 0-127 are taken as H7.

A TA is assumed to be trusted. The assumption is that session keys between client A and server B are generated based on the SKSSE shared secret and some other shared secret exchange with ECDH or RSA. However, it is theoretically possible that a TA is compromised. For the TA to get access to a client-server session key it would have to:

Intercept the traffic between A and B to get access to the OSVA and OSVB (obfuscated secret value) values and have a quantum computer to break the ECDH/RSA shared secret.

Alternatively, it could capture and store all traffic from B, all traffic between A and B and keep this data until sometime in the future where a quantum computer can be used to break the ECDH/RSA shared secret.

Even though this an extremely unlikely scenario it would be easy to address this by adding a second TA and have the session key based on two independent shared secrets using two independent TAs.

Recapitulation

Given the preceding description and in view of the accompanying drawings, it will be appreciated by those of ordinary skill in the relevant art that, according to an aspect of the disclosure, a method is provided for securely entering an access code using an insecure device. The method includes at 510 generating a random code and displaying the random code at a display; selecting a digit of the random code in response to a first input from the insecure device; adjusting the selected digit of the random code in response to a second input from the insecure device; and repeating the steps of selecting and adjusting digits of the random code until the incremented digits of the random code match all digits of the access code.

In one or more embodiments, the display is a display 103 of the insecure device 102. In one or more embodiments, the access code is a code of a secure device 100 that is connected in communication with the insecure device. In one or more embodiments, the display is a display 214 of the secure device. In one or more embodiments, the secure device performs the steps of generating, displaying, selecting, and incrementing. In some embodiments, the method also includes denying access to a memory 201 of a secure device in response to the incremented digits of the random code not matching all digits of the access code. In some embodiments, the method also includes granting access to a memory 201 of a secure device in response to the incremented digits of the random code matching all digits of the access code. In one or more embodiments, the method also includes, in response to selecting a subsequent digit of the random code, prohibiting re-selection of a previous digit.

Another aspect of the disclosure provides a secure device 100, which includes a main processor 205; a first interface 210 that is adapted to connect an external visual display in communication with the main processor; a second interface 208 that is adapted to connect a keyboard in communication with the main processor; a third interface 206 that is adapted to connect an insecure device in communication with the main processor; a secure micro 201 that is connected in communication with the main processor; and an internal visual display 214 connected in communication with the main processor. The secure microprocessor includes a tamper-proof CPU that is adapted to provide a password manager module 203 and includes a tamper-proof memory that embodies a plurality of passwords and computer executable instructions for adapting the tamper-proof CPU to provide the password manager module. The main processor is configured by the computer executable instructions to implement a method 300, which includes: at 305-312 securely entering a server password from the keyboard to the password manager module; and at 314-316 securely delivering the server password to the server via an insecure device.

In one or more embodiments, securely entering the server password includes: at 305 displaying a user interface to the external visual display via the first interface; at 306 receiving a password manager password from the keyboard via the second interface; at 307 enabling the password manager module in response to the password manager password; at 308 displaying a password entry dialog at the user interface; at 310 receiving the server password and a server password name from the keyboard via the second interface; and at 312 storing the server password and the server password name in the password manager module.

In one or more embodiments, securely delivering the server password includes at 1100 establishing a secure connection with the server via the insecure device. In one or more embodiments, establishing a secure connection includes: at 1102 sending a shared secret request ShSReqA and an obfuscated secret value OSVA of the secure device A from the secure device to the server B via the insecure device; at 1112 receiving a shared secret response ShSRespA and an obfuscated secret value of the server OSVB from the server B via the insecure device; at 1114 calculating a shared secret ShS of the secure device and the server by concatenating the secure device's secret value and the server's secret value and hashing the result; at 1118 generating a session key SSK for the secure connection based on the shared secret; and at 1120 establishing the secure connection using the session key SSK to encrypt all traffic between the secure device and the server via the insecure device. The shared secret request ShSReqA is encrypted by a rolling key RKA known to the secure device and to a trusted authority but not known to the insecure device or to the server and the shared secret request incorporates a secure device obfuscation key OKA for decrypting the secure device's obfuscated secret value. The shared secret response ShSRespA is encrypted by the secure device's rolling key and the shared secret response incorporates a server obfuscation key OKB for decrypting the server's obfuscated secret value.

In one or more embodiments, securely delivering the server password includes: at 310 receiving the server password from the keyboard via the second interface; and at 316 sending the server password to the server via the secure connection over the insecure device. In one or more embodiments, securely delivering the server password includes: at 307 enabling the password manager module in response to receipt of a server nonce via the insecure device; at 510 generating a random code; displaying the random code via a user interface at a display of the insecure device, selecting a digit of the random code in response to a first input from the insecure device, adjusting the selected digit of the random code in response to a second input from the insecure device, and repeating the steps of selecting and adjusting digits of the random code until the incremented digits of the random code match all digits of an access code of the password manager module; at 512 displaying a password manager module interface in response to matching all digits of the access code, wherein the password manager module interface displays one or more password names; selecting a password name in response to a third input from the insecure device; and at 514 retrieving the server password from the password manager module in response to selecting the password name. In one or more embodiments, securely delivering the server password to the server further includes: at 312 and 800 hashing a hash of the server password with the server nonce; and at 314 sending the hash of the hash to the server via the insecure device.

In one or more embodiments, securely delivering the server password includes: at 307-312 receiving the server password from the keyboard via the second interface; at 314 hashing the server password with a server nonce received from the server; and at 316 sending the hashed server password to the server via the insecure device.

According to another aspect, the disclosure provides a method 1100 for establishing a secure connection from a device A to a server B. The method includes, at the device A: at 1102 sending a first shared secret request ShSReqA and an obfuscated secret value OSVA of the device from the device to the server, wherein the first shared secret request is encrypted by a symmetric rolling key RKA known to the device and to a trusted authority but not known to the server and the first shared secret request incorporates a symmetric device obfuscation key OKA for decrypting the device's obfuscated secret value; at 1112 receiving a first shared secret response ShSRespA and an obfuscated secret value OSVB of the server from the server, wherein the first shared secret response is encrypted by the device's symmetric rolling key RKA and the first shared secret response incorporates a symmetric server obfuscation key OKB for decrypting the server's obfuscated secret value OSVB; at 1114 calculating a shared secret ShS of the device and the server by concatenating the device's secret value and the server's secret value and hashing the result; at 1116 generating a symmetric session key SSK for the secure connection based on the shared secret; and at 1118 establishing the secure connection using the symmetric session key to encrypt all traffic between the device and the server.

In one or more embodiments, the method also includes, at the trusted authority TA: at 1105 receiving a combined shared secret request from the server B, wherein the combined shared secret request incorporates the first shared secret request ShSReqA from the secure device A and a second shared secret request ShSReqB from the server B; at 1106 obtaining the first shared secret request ShSReqA and the server obfuscation key OKB by decrypting the combined shared secret request using a rolling key RKB shared by the server and the trusted authority but not known to the secure device or to the insecure device, obtaining the secure device obfuscation key OKA by decrypting the first shared secret request ShSReqA using the secure device's rolling key RKA, forming the first shared secret response ShSRespA by encrypting the server obfuscation key OKB with the secure device's rolling key RKA, and forming a second shared secret response ShSRespB by encrypting the secure device obfuscation key OKA with the server's rolling key RKB; and at 1108 sending the first shared secret response and the second shared secret response to the server.

In one or more embodiments, the method also includes, at the server: at 1103 receiving the first shared secret request from the secure device; at 1104 forming the combined shared secret request by concatenating the first shared secret request with the server obfuscation key and encrypting the concatenation using the server's rolling key, and sending the combined shared secret request to the trusted authority; at 1109 receiving the first shared secret response and the second shared secret response from the trusted authority; at 1110 obtaining the shared device obfuscation key by decrypting the second shared secret response and obtaining the secure device's secret value by decrypting the secure device's obfuscated secret value using the shared device obfuscation key; and at 1112 sending the first shared secret response and the server's obfuscated secret value to the secure device.

In one or more embodiments, the method also includes securely transferring data from the device to the server using the secure connection.

Another aspect of the disclosure provides a method for password-based authentication of a client to a server. The method includes: at 304 the server sending a nonce to the client; at 314, 400 the client generating a cryptographically secure hash from the nonce and a secure hashed version of a client password; at 316 the client sending the cryptographically secure hash to the server; at 318 the server, which has a copy of the secure hashed version of the client password, verifying that the cryptographically secure hash can only be generated from the secure hashed version of the password and the nonce; and at 320 the server granting access to the client in response to the verifying step.

System and Article of Manufacture Details

The invention can employ software and/or hardware aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 18:
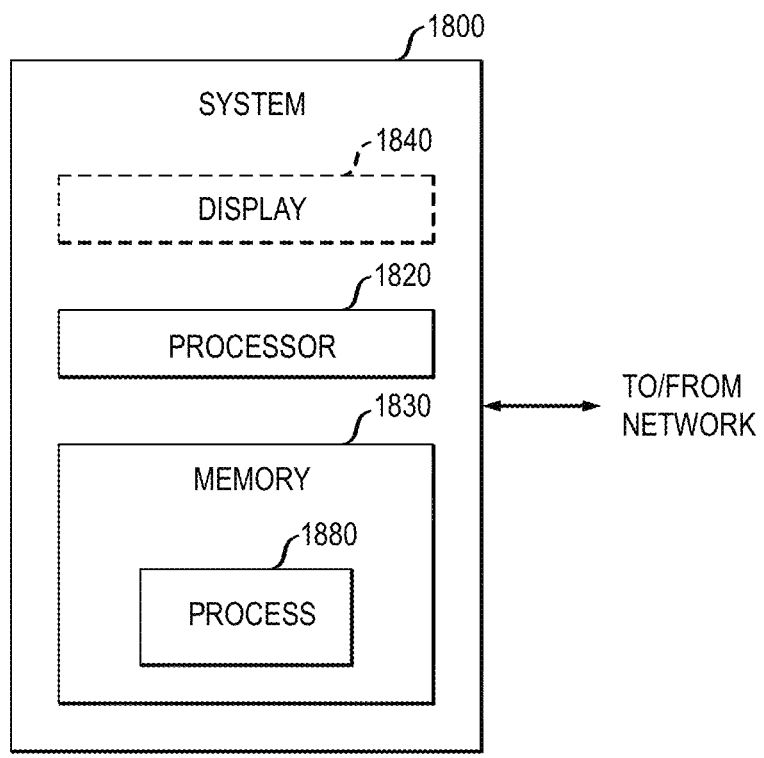
FIG. 18 is a block diagram of a computer system useful in connection with one or more aspects of the invention.

FIG. 18 is a block diagram of a system 1800 that can implement at least some aspects of the invention, and is representative, for example, of one or more of the servers, computers, or processing devices shown in the figures. As shown in FIG. 18, memory 1830 configures the processor 1820 to implement one or more methods, steps, and functions (collectively, shown as process 1880 in FIG. 18). The memory 1830 could be distributed or local and the processor 1820 could be distributed or singular. Different steps could be carried out by different processors.

The memory 1830 could be implemented as an electrical, magnetic or optical memory, or any combination of these or other types of storage devices. It should be noted that if distributed processors are employed, each distributed processor that makes up processor 1820 generally contains its own addressable memory space. It should also be noted that some or all of computer system 1800 can be incorporated into an application-specific or general-use integrated circuit.

For example, one or more method steps could be implemented in hardware in an ASIC or via a field-programmable gate array (FPGA) rather than using firmware. Display 1840 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1800 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the servers shown in the figures or on a computer or other device with processing capability, and that such program may be embodied on a tangible computer readable recordable storage medium. As used herein, including the claims, unless it is unambiguously apparent from the context that only server software is being referred to, a "server" includes a physical data processing system (for example, system 1800 as shown in FIG. 18) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the software-implementable components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A secure device comprising:
   a main processor;
   a first interface that is adapted to connect an external visual display in communication with the main processor;
   a second interface that is adapted to connect a keyboard in communication with the main processor;
   a third interface that is adapted to connect an insecure device in communication with the main processor;
   a secure microprocessor that is connected in communication with the main processor, wherein the secure microprocessor includes a tamper-proof central processing unit (CPU) that is adapted to provide a password manager module and includes a tamper-proof memory that embodies a plurality of passwords and computer executable instructions for adapting the tamper-proof CPU to provide the password manager module; and
   an internal visual display connected in communication with the main processor,
   wherein the main processor is configured by the computer executable instructions to:
   securely enter a server password from the keyboard to the password manager module; and
   securely deliver the server password to the server via an insecure device, wherein securely delivering the server password includes repeatedly selecting and adjusting a proper subset of digits of a random code until adjusted digits of the random code match all digits of an access code of the password manager module displayed on the internal visual display.

2. The secure device of claim 1 wherein securely delivering the server password comprises establishing a secure connection with the server via the insecure device.

3. The secure device of claim 1 wherein securely delivering the server password comprises:
receiving the server password from the keyboard via the second interface;
hashing the server password with a server nonce received from the server; and
sending the hashed server password to the server via the insecure device.

4. The secure device of claim 1, wherein a first adjusting operation of the repeated adjusting operations adjusts less than all digits of the random code and results in a mismatch of the adjusted digits of the random code and the access code of the password manager module displayed on the internal visual display.

5. The secure device of claim 1, wherein the securely entering the server password comprises:
receiving the server password and a server password name from the keyboard; and
storing the server password and the server password name in the password manager module.

6. A secure device comprising:
a main processor;
a first interface that is adapted to connect an external visual display in communication with the main processor;
a second interface that is adapted to connect a keyboard in communication with the main processor;
a third interface that is adapted to connect an insecure device in communication with the main processor;
a secure microprocessor that is connected in communication with the main processor, wherein the secure microprocessor includes a tamper-proof central processing unit (CPU) that is adapted to provide a password manager module and includes a tamper-proof memory that embodies a plurality of passwords and computer executable instructions for adapting the tamper-proof CPU to provide the password manager module; and
an internal visual display connected in communication with the main processor,
wherein the main processor is configured by the computer executable instructions to:
securely enter a server password from the keyboard to the password manager module; and
securely deliver the server password to the server via an insecure device, wherein securely delivering the server password includes repeatedly selecting and adjusting digits of a random code until adjusted digits of the random code match all digits of an access code of the password manager module displayed on the internal visual display, wherein the securely entering the server password comprises:
displaying a user interface to the external visual display via the first interface;
receiving a password manager password from the keyboard via the second interface;
enabling the password manager module in response to the password manager password;
displaying a password entry dialog at the user interface;
receiving the server password and a server password name from the keyboard via the second interface; and
storing the server password and the server password name in the password manager module.

7. A secure device comprising:
a main processor;
a first interface that is adapted to connect an external visual display in communication with the main processor;
a second interface that is adapted to connect a keyboard in communication with the main processor;
a third interface that is adapted to connect an insecure device in communication with the main processor;
a secure microprocessor that is connected in communication with the main processor, wherein the secure microprocessor includes a tamper-proof central processing unit (CPU) that is adapted to provide a password manager module and includes a tamper-proof memory that embodies a plurality of passwords and computer executable instructions for adapting the tamper-proof CPU to provide the password manager module; and
an internal visual display connected in communication with the main processor,
wherein the main processor is configured by the computer executable instructions to:
securely enter a server password from the keyboard to the password manager module; and
securely deliver the server password to the server via an insecure device, wherein securely delivering the server password comprises establishing a secure connection with the server via the insecure device; and
wherein establishing a secure connection comprises:
sending a shared secret request and an obfuscated secret value of the secure device from the secure device to the server via the insecure device, wherein the shared secret request is encrypted by a rolling key known to the secure device and to a trusted authority but not known to the insecure device or to the server and the shared secret request incorporates a secure device obfuscation key for decrypting the secure device's obfuscated secret value;
receiving a shared secret response and an obfuscated secret value of the server from the server via the insecure device, wherein the shared secret response is encrypted by the secure device's rolling key and the shared secret response incorporates a server obfuscation key for decrypting the server's obfuscated secret value;
calculating a shared secret of the secure device and the server by concatenating the secure device's secret value and the server's secret value and hashing the result;
generating a session key for the secure connection based on the shared secret; and
establishing the secure connection using the session key to encrypt all traffic between the secure device and the server via the insecure device.

8. The secure device of claim 2 wherein securely delivering the server password comprises:
receiving the server password from the keyboard via the second interface; and
sending the server password to the server via the secure connection over the insecure device.

9. A secure device comprising:
a main processor;
a first interface that is adapted to connect an external visual display in communication with the main processor;

a second interface that is adapted to connect a keyboard in communication with the main processor;

a third interface that is adapted to connect an insecure device in communication with the main processor;

a secure microprocessor that is connected in communication with the main processor, wherein the secure microprocessor includes a tamper-proof central processing unit (CPU) that is adapted to provide a password manager module and includes a tamper-proof memory that embodies a plurality of passwords and computer executable instructions for adapting the tamper-proof CPU to provide the password manager module; and an internal visual display connected in communication with the main processor, wherein the main processor is configured by the computer executable instructions to:

securely enter a server password from the keyboard to the password manager module; and securely deliver the server password to the server via an insecure device, wherein securely delivering the server password comprises:

enabling the password manager module in response to receipt of a server nonce via the insecure device;

generating a random code;

displaying the random code via a user interface at a display of the insecure device;

selecting a digit of the random code in response to a first input from the insecure device;

adjusting the selected digit of the random code in response to a second input from the insecure device;

repeating the steps of selecting and adjusting digits of the random code until the incremented digits of the random code match all digits of an access code of the password manager module;

displaying a password manager module interface in response to matching all digits of the access code, wherein the password manager module interface displays one or more password names;

selecting a password name in response to a third input from the insecure device; and retrieving the server password from the password manager module in response to selecting the password name.

10. The secure device of claim 9 wherein securely delivering the server password to the server further comprises:

hashing a hash of the server password with the server nonce; and sending the hash of the hash to the server via the insecure device.

\* \* \* \* \*